(12) United States Patent
Varkey et al.

(10) Patent No.: US 9,846,289 B2
(45) Date of Patent: Dec. 19, 2017

(54) METHOD FOR MANUFACTURING A CABLE COMPONENT

(75) Inventors: Joseph Varkey, Sugar Land, TX (US); Vadim Protasov, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 215 days.

(21) Appl. No.: 13/821,950

(22) PCT Filed: Sep. 8, 2011

(86) PCT No.: PCT/US2011/050833
§ 371 (c)(1),
(2), (4) Date: May 17, 2013

(87) PCT Pub. No.: WO2012/047440
PCT Pub. Date: Apr. 12, 2012

(65) Prior Publication Data
US 2013/0227837 A1    Sep. 5, 2013

Related U.S. Application Data

(60) Provisional application No. 61/380,928, filed on Sep. 8, 2010.

(51) Int. Cl.
*H01R 43/00* (2006.01)
*G02B 6/44* (2006.01)
*H01B 13/22* (2006.01)

(52) U.S. Cl.
CPC ......... *G02B 6/4401* (2013.01); *G02B 6/4488* (2013.01); *H01B 13/22* (2013.01); *Y10T 29/49117* (2015.01); *Y10T 29/49947* (2015.01)

(58) Field of Classification Search
CPC ......... Y10T 29/49117; Y10T 29/49123; Y10T 29/49194; Y10T 29/49201; H02G 1/1256; H01R 2103/00
(Continued)

(56) References Cited

U.S. PATENT DOCUMENTS 3,082,292 A * 3/1963 Gore .................... 174/117 F
3,802,974 A * 4/1974 Emmel .................... 156/55
(Continued)

FOREIGN PATENT DOCUMENTS

| GB | 1186604 A | 4/1970 |
|---|---|---|
| JP | S60225809 A | 11/1985 |
| JP | 07-092359 | 4/1995 |

OTHER PUBLICATIONS

International Search Report, Application No. PCT/US2011/050833, dated Apr. 9, 2012.
(Continued)

*Primary Examiner* — Paul D Kim
(74) *Attorney, Agent, or Firm* — Trevor G. Grove

(57) ABSTRACT

An embodiment of a method for manufacturing a cable component includes providing at least a pair of shaped wire members, passing the wire members through at least one shaped roller set, providing at least one cable portion, placing the wire members over the cable portion and running the wire members and cable portion through an assembly roller to form a subassembly, and attaching a fixing element to the subassembly to secure the wire members and cable portion to complete the cable component.

15 Claims, 4 Drawing Sheets

(58) Field of Classification Search
USPC .................................. 29/825, 828, 868, 872
See application file for complete search history.

(56) References Cited

U.S. PATENT DOCUMENTS

| | | | | |
|---|---|---|---|---|
| 3,920,432 | A * | 11/1975 | Smith .............................. | 65/408 |
| 4,289,558 | A * | 9/1981 | Eichenbaum et al. ........ | 156/179 |
| 4,329,018 | A | 5/1982 | Dubost | |
| 4,443,657 | A * | 4/1984 | Hill ...................... | G02B 6/4403 |
| | | | | 156/52 |
| 4,567,321 | A * | 1/1986 | Harayama ................. | 174/117 F |
| 4,793,683 | A * | 12/1988 | Cannon et al. ................. | 385/60 |
| 4,980,007 | A * | 12/1990 | Ferguson ..................... | 156/179 |
| 5,208,889 | A * | 5/1993 | Cedrone et al. ............. | 385/114 |
| 5,259,050 | A * | 11/1993 | Yamakawa et al. ............ | 385/59 |
| 5,309,537 | A * | 5/1994 | Chun et al. ..................... | 385/59 |
| 5,574,817 | A * | 11/1996 | Henson et al. ............... | 385/114 |
| 5,744,756 | A * | 4/1998 | Springer .............. | H01B 7/0838 |
| | | | | 174/110 F |
| 5,778,652 | A | 7/1998 | Kunze | |
| 6,054,032 | A * | 4/2000 | Haddad et al. ............... | 204/451 |
| 6,766,578 | B1 * | 7/2004 | Swanson et al. ............... | 29/868 |
| 7,163,327 | B2 * | 1/2007 | Henson et al. ............... | 362/554 |
| 7,456,805 | B2 * | 11/2008 | Ouderkirk et al. ............. | 345/32 |
| 7,538,276 | B2 * | 5/2009 | Narumi ..................... | 174/117 F |
| 2007/0175652 | A1 * | 8/2007 | Narumi ..................... | 174/117 F |
| 2009/0038149 | A1 | 2/2009 | Varkey | |
| 2010/0219555 | A1 * | 9/2010 | Mehan ............... | B29C 47/0023 |
| | | | | 264/173.12 |

OTHER PUBLICATIONS

Extended Search Report issued in the related EP application 11831149.7, dated Oct. 26, 2017 (9 pages).

* cited by examiner

METHOD FOR MANUFACTURING A CABLE COMPONENT

BACKGROUND

The statements in this section merely provide background information related to the present disclosure.

In creating cable components, such as fiber optics components for oilfield applications, special care is taken to protect the optical fibers in the downhole environment. Often, this has been accomplished by sealing them in a seam-welded tube. This strategy may have problems including, but not limited to, wherein the seam-welding process may be relatively slow and fiber optic components with metal tubes may be expensive. Difficult-to-detect pinholes may form or remain when the tubes are welded to encase the optical fibers, welding gases may be trapped inside the tube, which may lead to deterioration of the optical fibers inside the tube, which may lead to optical signal attenuation. The metal tube is sufficiently thick to prevent collapse under moderate loads or torque, or under high pressure, which thickness may take up valuable space within the cable core. The metal tube may have limited flexibility, may have a low fatigue life in dynamic applications, and often cannot be spliced without over-sizing the metal tube.

Some embodiments have incorporated shaped, semi-circular-profile wires that come together to form a circular component over one or more optical fibers encased in a soft polymer at the component core. While this method avoids many of the problems of seam-welded tubing, it is difficult to hold the shaped wires in the proper orientation as they are brought together over the core.

It remains desirable to provide improvements in wireline cables, cable components, and/or downhole assemblies.

SUMMARY

An embodiment of a method for manufacturing a cable component comprises providing at least a pair of shaped wire members, passing the wire members through at least one shaped roller set, providing at least one cable portion, placing the wire members over the cable portion and running the wire members and cable portion through an assembly roller to form a cable subassembly, and attaching a fixing element to the cable subassembly to secure the wire members and cable portion to complete the cable component.

BRIEF DESCRIPTION OF THE DRAWINGS

These and other features and advantages of the present disclosure will be better understood by reference to the following detailed description when considered in conjunction with the accompanying drawings wherein:

FIG. 1*a* is a schematic view of an embodiment of a manufacturing system.

DETAILED DESCRIPTION

Referring now to FIGS. 1*a* through 4, a manufacturing system is indicated generally at 10. A cable portion or component, such as an optical fiber 12, is fed from a spool or the like (not shown) and passes through an extruder 14. The extruder 14 extrudes a polymer layer 16 over the optical fiber 12. In an embodiment, the portion 12 comprises an optical fiber or an electrical conductor comprising a polymer jacket layer, similar to the polymer layer 16, disposed on an exterior surface thereof. In such an embodiment, an extruder 14 would not be utilized for the portion 12 already having the polymer layer 16, as will be appreciated by those skilled in the art.

Figure 1B:
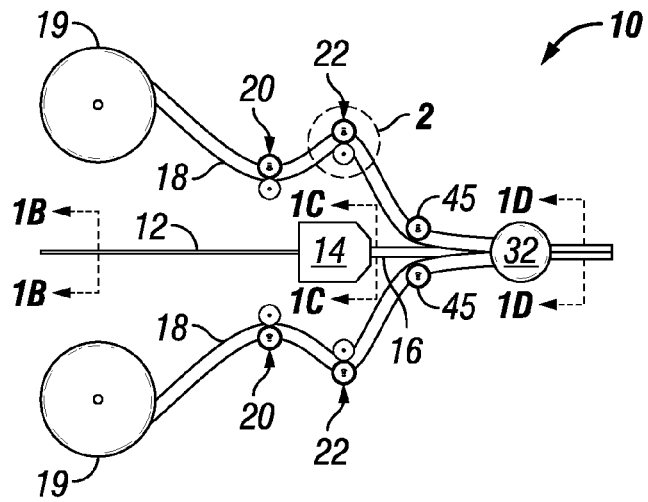
FIG. 1*b* is schematic cross sectional view taken along line 1*b*-1*b* in FIG. 1*a*.
Figure 1B:
Figure 1C:
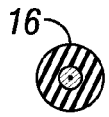
FIG. 1*c* is schematic cross sectional view taken along line 1*c*-1*c* in FIG. 1*a*.
Figure 1D:
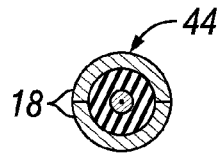
FIG. 1*d* is schematic cross sectional view taken along line 1*d*-1*d* in FIG. 1*a*.
Figure 2:
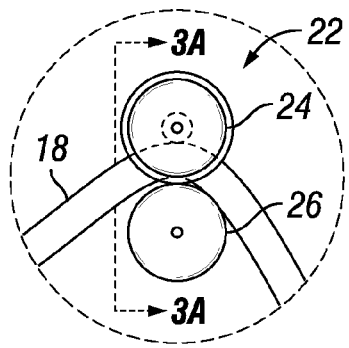
FIG. 2 is a schematic view, in an enlarged scale, of the encircled portion 2 in FIG. 1*a*.
Figure 3A:
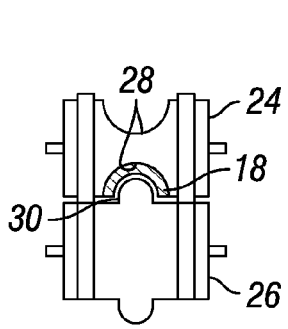
FIG. 3*a* is a schematic cross sectional view of a roller assembly taken along line 3*a*-3*a* in FIG. 2.
Figure 3B:
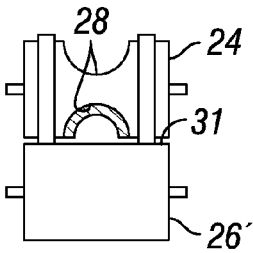
FIG. 3*b* is a schematic cross sectional view of an embodiment of a roller assembly.
Figure 4:
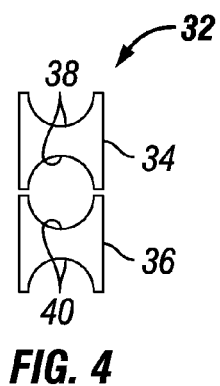
FIG. 4 is a schematic side view of an assembly roller for use with the manufacturing system of FIG. 1.

At least a pair of semi-circular-profile shaped wires 18 is passed from a respective feed spool 19 or the like, through a first set of shaped rollers 20 and a second set of shaped rollers 22. The shaped wires 18 may comprise a metallic material such as, but not limited to, copper, nickel plated copper, steel alloys or the like. The shaped rollers 22 comprise a first roller 24 and a second roller 26. The first roller 24 comprises a concave inner surface 28 that substantially conforms to a side surface of the semi-circular-profile shaped wires 18. The second roller 26 comprises a convex inner surface 30 that substantially conforms to an opposite side surface of the semi-circular-profile shaped wires 18. The semi-circular-profile shaped wires 18 are disposed between the surfaces 28 and 30 of the rollers 24 and 26 during operation of the system 10, as seen in FIG. 3a and discussed in more detail below. In an embodiment (best seen in FIG. 3b), a second roller 26' comprises a substantially planar or flat surface 31 for engagement with the surface of the semi-circular-profile shaped wires 18. It is understood that greater or fewer rollers, such as the rollers 20, 22 may be may be utilized for the system 10 in any suitable configuration. In an embodiment, the rollers may comprise straightening rollers in an offset configuration suitable for removing variations in the shaped wires 18 such that when the shaped wires 18 are joined together, the wires 18 will form a substantially circular shape, discussed in more detail below. The straightening rollers may comprise alternating individual rollers, such as the roller 24, for engaging with only one side surface of the shaped wires 18 at a time. Successive rollers, such as the roller 24, engage with alternate outer side surfaces of the shaped wires 18 as the shaped wires 18 move during operation of the system 10, discussed in more detail below. The shaped semi-circular-profile shaped wires 18 pass through rollers 20 and 22 to hold them in a proper general orientation prior to closing over a cable portion or component, such as the optical fiber 12.

The shaped wires 18 and the cable portion 12 are directed to a assembly roller 32. The multiple pairs of shaped rollers 20 and 22 ensure the shaped wires 18 are in a proper orientation before entering the assembly roller 32. The assembly roller 32 comprises a first roller 34 and a second roller 36, best seen in FIG. 4. The first roller 34 comprises a concave inner surface 38 that substantially conforms to an exterior surface of one of the semi-circular-profile shaped wires 18. The second roller 36 comprises a concave inner surface 40 that substantially conforms to an exterior surface of the other of the semi-circular-profile shaped wires 18. The portion 12 is directed to a position between the semi-circular-profile shaped wires 18 and the surfaces 38 and 40 of the assembly roller 32. The assembly roller 32 closes the wires 18 over the portion 12, which places the shaped wires 18 and portion 12 to form a core subassembly 44 in a substantially circular configuration, shown in FIG. 1c. The assembly roller 32 may be configured to place the core subassembly 44 in other configurations, such as an oval configuration or the like. The shaped wires 18 may pass through a third (or more) set of rollers 45 prior to entering the assembly roller 32.

After the shaped wires 18 and cable portion 12 have passed through the assembly roller 32 to form the core subassembly 44, the core subassembly 44 is completed with a fixing element in order to secure or fix the shaped wires 18 and the portion 12 in the proper orientation for subsequent use. The fixing element may comprise a polymer layer, a mechanical element, or both, discussed in more detail below.

Figure 5A:
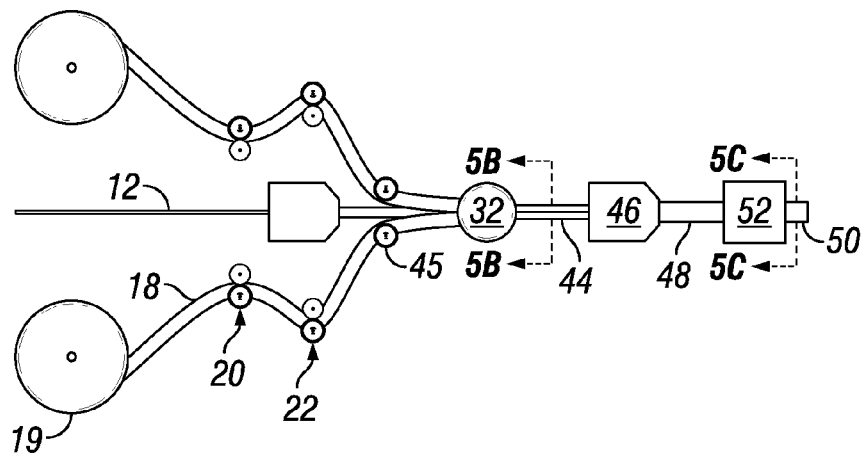
FIG. 5*a* is a schematic view of an embodiment of a manufacturing system.
Figure 5B:
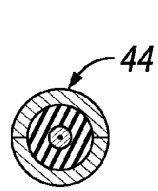
FIG. 5*b* is schematic cross sectional view taken along line 5*b*-5*b* in FIG. 5*a*.
Figure 5C:
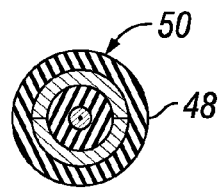
FIG. 5*c* is schematic cross sectional view taken along line 5*c*-5*c* in FIG. 5*a*.
Figure 6A:
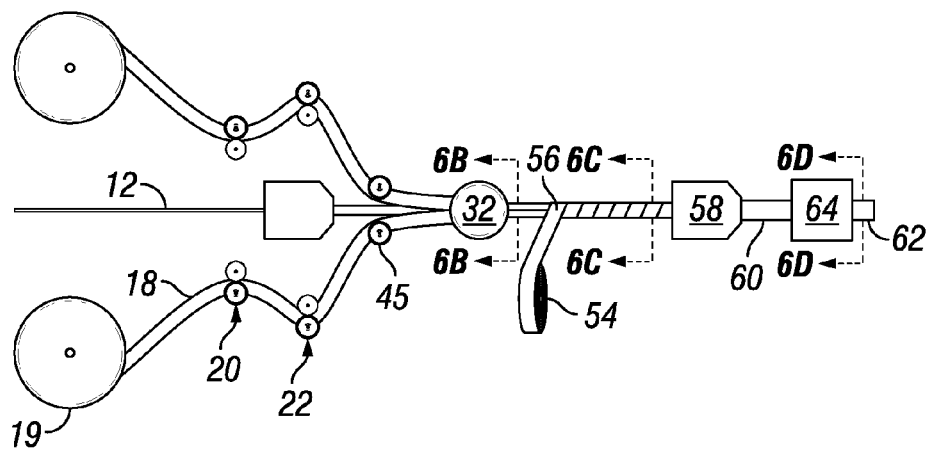
FIG. 6*a* is a schematic view of an embodiment of a manufacturing system.
Figure 6B:
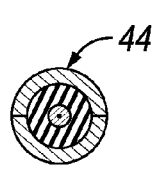
FIG. 6*b* is schematic cross sectional view taken along line 6*b*-6*b* in FIG. 6*a*.
Figure 6C:
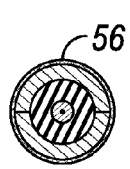
FIG. 6*c* is schematic cross sectional view taken along line 6*c*-6*c* in FIG. 6*a*.
Figure 6D:
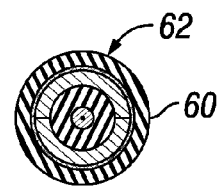
FIG. 6*d* is schematic cross sectional view taken along line 6*d*-6*d* in FIG. 6*a*.
Figure 7A:
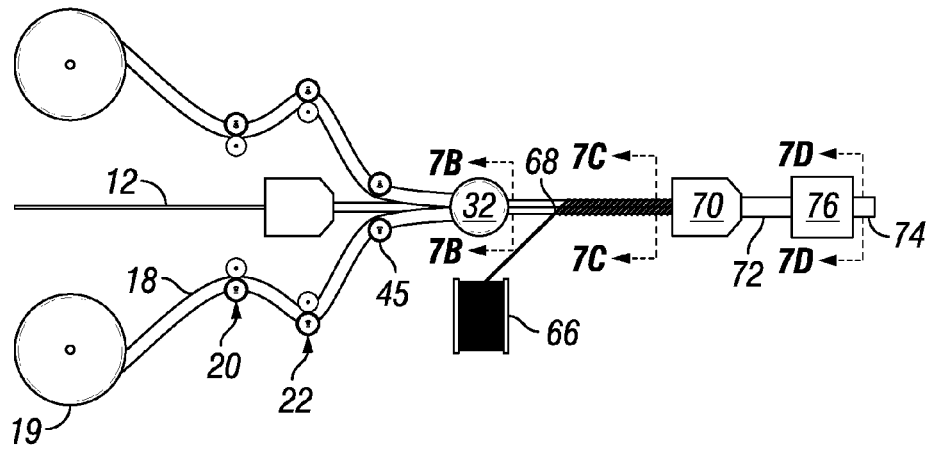
FIG. 7*a* is a schematic view of an embodiment of a manufacturing system.
Figure 7B:
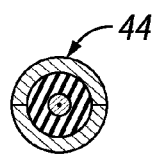
FIG. 7*b* is schematic cross sectional view taken along line 7*b*-7*b* in FIG. 7*a*.
Figure 7C:
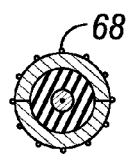
FIG. 7*c* is schematic cross sectional view taken along line 7*c*-7*c* in FIG. 7*a*.
Figure 7D:
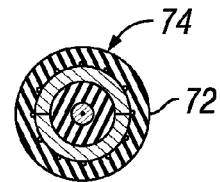
FIG. 7*d* is schematic cross sectional view taken along line 7*d*-7*d* in FIG. 7*a*.
Figure 8A:
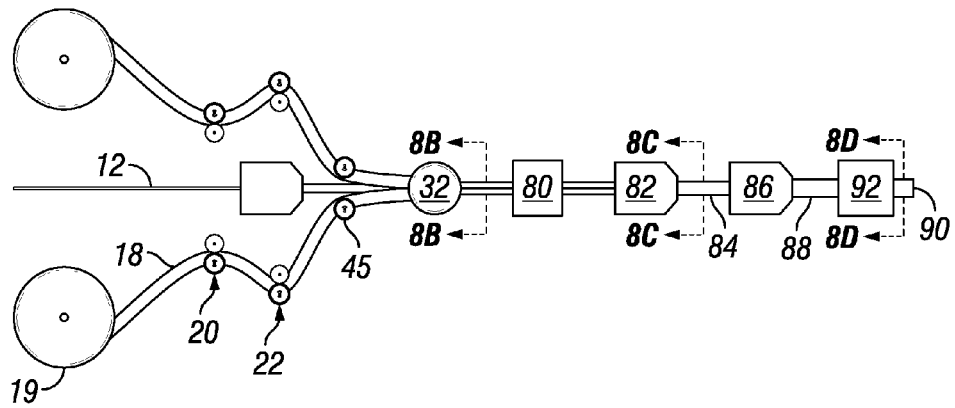
FIG. 8*a* is a schematic view of an embodiment of a manufacturing system.
Figure 8B:
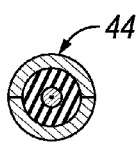
FIG. 8*b* is schematic cross sectional view taken along line 8*b*-8*b* in FIG. 8*a*.
Figure 8C:
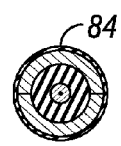
FIG. 8*c* is schematic cross sectional view taken along line 8*c*-8*c* in FIG. 8*a*.
Figure 8D:
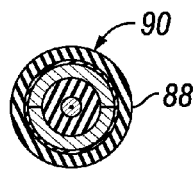
FIG. 8*d* is schematic cross sectional view taken along line 8*d*-8*d* in FIG. 8*a*.
Figure 9A:
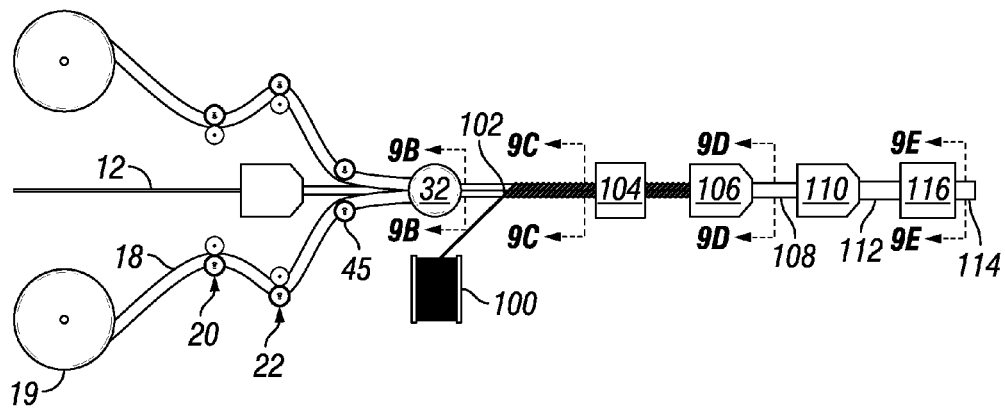
FIG. 9*a* is a schematic view of an embodiment of a manufacturing system.
Figure 9B:
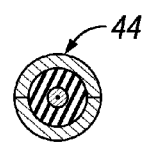
FIG. 9*b* is schematic cross sectional view taken along line 9*b*-9*b* in FIG. 1*a*.
Figure 9C:
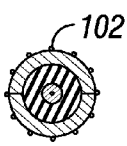
FIG. 9*c* is schematic cross sectional view taken along line 9*c*-9*c* in FIG. 1*a*.
Figure 9D:
FIG. 9*d* is schematic cross sectional view taken along line 9*d*-9*d* in FIG. 1*a*.
Figure 9E:
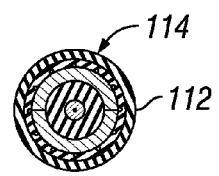
FIG. 9*e* is schematic cross sectional view taken along line 9*e*-93 in FIG. 1*a*.

Referring now to FIGS. 5a through 5c, in an embodiment, the core subassembly 44 passes from the assembly roller 32 through an extruder 46. The extruder 46 extrudes a jacket polymer layer 48 over the core subassembly 44 to secure or fix the shaped wires 18 and cable portion 12 in the proper orientation and form a jacketed completed component 50. The completed component 50 is passed through a water bath, such as a chilled water bath 52, to shorten the exposure of the optical fibers of the cable portion 12 to high temperatures and to maintain the substantially circular shape provided by the assembly roller 32.

Referring now to FIGS. 6a through 6d, in an embodiment, the core subassembly 44 passes from the assembly roller 32 adjacent to a cable taping machine or head 54, where a cabling tape 56 is passed around the core subassembly 44 to secure or fix the shaped wires 18 and cable portion 12 in the proper orientation. The core subassembly 44 with the tape 56 then passes through an extruder 58. The extruder 58 extrudes a jacket polymer layer 60 over the core subassembly 44 and the tape 56 to secure fix the shaped wires 18 and cable portion 12 in the proper orientation and form a completed and jacketed component 62. The completed component 62 is passed through a chilled water bath 64 to shorten the exposure of the optical fibers of the cable portion 12 to high temperatures and to maintain the substantially circular shape provided by the assembly roller 32.

Referring now to FIGS. 7a through 7d, in an embodiment, the core subassembly 44 passes from the assembly roller 32 adjacent to a serving machine 66, where a layer of served wire 68 is passed around the core subassembly 44 to secure or fix the shaped wires 18 and cable portion 12 in the proper orientation. The core subassembly 44 with the served wire 68 then passes through an extruder 70. The extruder 70 extrudes a jacket polymer layer 72 over the core subassembly 44 and the served wire 68 to fix the shaped wires 18 and portion 12 in the proper orientation and form a jacketed completed component 74. The completed component 74 is passed through a chilled water bath 76 to shorten the exposure of the optical fibers of the cable portion 12 to high temperatures and to maintain the substantially circular shape provided by the assembly roller 32. The wire 68 may comprise, but is not limited to, a metallic wire, a synthetic twisted yarn, or a rope.

Referring now to FIGS. 8a through 8d, in an embodiment, the core subassembly 44 passes from the assembly roller 32 through a heat source, such as an infrared heat source 80, which heats or modifies the exterior surface of the shaped wires 18. The core subassembly 44 then passes to an extruder 82, which extrudes a thin tie layer 84 of polymer over the core subassembly 44. The tie layer 84 comprises a polymer modified to bond with metal, for example, but not limited to, a polymer modified with Maleic Anhydride. The core subassembly 44 with the tie layer 84 then passes through an extruder 86, which extrudes a jacket polymer layer 88 over the core subassembly 44 and the tie layer 84 to fix the shaped wires 18 and cable portion 12 in the proper orientation and form a jacketed completed component 90. The completed component 90 is passed through a water bath, such as a chilled water bath 92 to shorten the exposure of the optical fibers to high temperatures and to maintain the substantially circular shape provided by the assembly roller 32.

Referring now to FIGS. 9a through 9e, the core subassembly 44 passes from the assembly roller 32 adjacent to a serving machine 100, where a layer of served wire 102 is passed around the core subassembly 44 to fix the shaped wires 18 and cable portion 12 in the proper orientation. The core subassembly 44 and served wire 102 then passes through a heat source, such as an infrared heat source 104, which heats or modifies the exterior surface of the shaped wires 18 and the served wire 102. The core subassembly 44 and served wire 102 then passes to an extruder 106, which extrudes a thin tie layer 108 of polymer over the core subassembly 44 and the served wire 102. The tie layer 108 comprises a polymer modified to bond with metal, for example, a polymer modified with Maleic Anhydride. The core subassembly 44 and the served wire 102 with the tie layer 108 then passes through an extruder 110, which extrudes a jacket polymer layer 112 over the core subassembly 44, the served wire 102, and the tie layer 84 to fix the shaped wires 18 and cable portion 12 in the proper orientation and form a jacketed completed component 114. The completed component 114 is passed through a water bath, such as a chilled water bath 116 to shorten the exposure of the optical fibers to high temperatures and to maintain the substantially circular shape provided by the assembly roller 32.

The embodiments presented herein comprise variations of cable portions or components such as fiber optic cable components that use a shared method of applying a rigid shell comprising at least two semi-circular-shaped wires. By running the shaped wires through a series of rollers, the shaped wires may better be held in the proper orientation as they close over a cable component contained in a soft polymeric jacket. This process may also allow for faster manufacturing speeds. Once the shaped wires are brought together over the cable component comprising the optical fibers, a number of methods may be used to secure or fix the core subassembly together as the manufacturing process continues.

Examples of polymers which may be used in the system 10 comprise, but are not necessarily limited to, fluoropolymers, fluorinated ethylene propylene (FEP) polymers, ethylene-tetrafluoroethylene polymers (Tefzel®), perfluoroalkoxyalkane polymer (PFA), polytetrafluoroethylene polymer (PTFE), polytetrafluoroethylene-perfluoromethylvinylether polymer (MFA), polyaryletherether ketone polymer (PEEK), or polyether ketone polymer (PEK) with fluoropolymer combination, polyphenylene sulfide polymer (PPS), PPS and PTFE combination, latex or rubber coatings, and the like.

Embodiments of the cable component may form a slickline cable or may be formed as a component of a wireline cable and used with wellbore devices to perform a wellbore operation in wellbores penetrating geologic formations that may contain gas and oil reservoirs. The cable components and/or wireline cables may be used to interconnect well logging tools, such as gamma-ray emitters/receivers, caliper devices, resistivity-measuring devices, seismic devices, neutron emitters/receivers, and the like, to one or more power supplies and data logging equipment outside the well. The cable components comprise a component of a seismic cable and used in seismic operations, including subsea and subterranean seismic operations. The cable components may also be useful as a component in permanent monitoring cables for wellbores The preceding description has been presented with references to certain embodiments of the invention. Persons skilled in the art and technology to which this disclosure pertains will appreciate that alterations and changes in the described structures and methods of operation can be practiced without meaningfully departing from the principle, and scope thereof. Accordingly, the foregoing description should not be read as pertaining to the precise structures described and shown in the accompanying drawings. Instead, the scope of the application is to be defined by the appended claims, and equivalents thereof.

The particular embodiments disclosed above are illustrative, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and such variations are considered within the scope and spirit of the invention. In particular, a range of values (of the form, "from about a to about b," or, equivalently, "from approximately a to b," or, equivalently, "from approximately a-b") disclosed herein is to be understood as referring to the power set (the set of all subsets) of the respective range of values. Accordingly, the protection sought herein is as set forth in the claims below.

What is claimed is:

1. A method for manufacturing a cable component, comprising:
   providing a pair of shaped wire members, wherein the pair of shaped wire members have a shape, allowing the pair of shaped wire members to form a metallic conductor with an opening therethrough when the pair of shaped wire members are engaged with one another;
   holding the pair of shaped wire members with at least one shaped roller set, wherein the at least one shaped roller set is configured to conform to the outer surfaces of the pair of shaped wire members, and wherein the at least one shaped roller set maintains the pair of shaped wire members in an orientation for placement about a cable portion, wherein the cable portion is enclosed in the opening formed through the engaged pair of shaped wire members;
   placing the pair of shaped wire members about the cable portion and running the wire members and cable portion through an assembly roller to form a core subassembly, wherein the core subassembly comprises the cable portion having the pair of shaped wire members engaged thereabout, wherein the pair of shaped wire members are conductors and protect the cable portion; and
   attaching a fixing element to the core subassembly to secure the pair of shaped wire members and cable portion to complete the cable component.

2. The method of claim 1 wherein passing each of the pair of shaped wire members through at least one shaped roller set places the wire members in a proper orientation for running through the assembly roller.

3. The method of claim 1 wherein the at least one shaped roller set comprises a roller having a concave surface and a roller having a convex surface, each of the surfaces configured to engage with an outer surface of the pair of shaped metallic wire members.

4. The method of claim 1 wherein providing the cable portion comprises providing a one of an optical fiber and a metallic conductor.

5. The method of claim 4 wherein the cable portion comprises a polymeric layer disposed on an exterior surface of the at least one cable portion.

6. The method of claim 4 further comprising extruding a polymer layer over an exterior surface of the cable portion.

7. The method of claim 1 wherein the assembly roller comprises rollers comprising a concave surface for cooperatively engaging an exterior surface of the at least a pair of wire members.

8. The method of claim 1 wherein attaching comprises extruding a layer of polymer over the core subassembly.

9. The method of claim 8 further comprising passing the core subassembly through a heat source to modify surfaces of the pair of shaped metallic wire members prior to extruding.

10. The method of claim 9 further comprising extruding a tie layer over the modified pair of shaped wire members prior to extruding.

11. The method of claim 8 further comprising passing the core subassembly through a water bath after extruding.

12. The method of claim 1 wherein attaching comprises wrapping a layer of tape over the core subassembly.

13. The method of claim 1 wherein attaching comprises cabling a layer of serve wire over the core subassembly.

14. The method of claim 1 wherein the cable component comprises a one of a slickline cable, a component of a wireline cable, and a component of a seismic cable.

15. The method of claim 14 further comprising deploying the cable component into a wellbore and performing at least one wellbore operation.

\* \* \* \* \*